United States Patent
Zhou et al.

(10) Patent No.: US 7,259,204 B2
(45) Date of Patent: Aug. 21, 2007

(54) TIRE COMPOSITIONS COMPRISING SURFACE-MODIFIED SILICA

(75) Inventors: Haiying Zhou, Golden Valley, MN (US); Mitch Barry, N. Canton, OH (US)

(73) Assignee: Bridgestone Corporation, Tokyo (JP)

( * ) Notice: Subject to any disclaimer, the term of this patent is extended or adjusted under 35 U.S.C. 154(b) by 41 days.

(21) Appl. No.: 11/070,653

(22) Filed: Mar. 1, 2005

(65) Prior Publication Data

US 2005/0203238 A1 Sep. 15, 2005

Related U.S. Application Data

(60) Provisional application No. 60/578,678, filed on Jun. 10, 2004, provisional application No. 60/548,985, filed on Mar. 1, 2004.

(51) Int. Cl.
*C08K 3/34* (2006.01)
*C08K 9/00* (2006.01)

(52) U.S. Cl. .................... 524/492; 523/216; 152/208
(58) Field of Classification Search ............... 524/492; 523/216; 152/208
See application file for complete search history.

(56) References Cited

U.S. PATENT DOCUMENTS

| | | | |
|---|---|---|---|
| 3,813,489 A | 5/1974 | Ramsay et al. ............... 178/7.2 |
| 3,842,111 A | 10/1974 | Ramsay et al. ........... 260/448.2 |
| 3,978,103 A | 8/1976 | Meyer-Simon et al. .. 260/448.8 |
| 3,997,581 A | 12/1976 | Pletka et al. ............. 260/448.8 |
| 4,002,594 A | 1/1977 | Fetterman ................ 260/42.37 |
| 4,082,660 A | 4/1978 | Papirer et al. ................. 210/36 |
| 5,227,425 A | 7/1993 | Rauline ....................... 524/493 |
| 5,580,919 A | 12/1996 | Agostini et al. ............ 524/430 |
| 5,583,245 A | 12/1996 | Parker et al. ............... 556/427 |
| 5,663,396 A | 9/1997 | Musleve ..................... 556/427 |
| 5,674,932 A | 10/1997 | Agostini et al. ............ 524/430 |
| 5,684,171 A | 11/1997 | Wideman et al. ........... 556/427 |
| 5,684,172 A | 11/1997 | Wideman et al. ........... 556/427 |
| 5,696,197 A | 12/1997 | Smith et al. ................ 524/495 |
| 5,717,022 A | 2/1998 | Beckmann et al. ......... 524/493 |
| 5,719,207 A | 2/1998 | Cohen et al. ............... 524/213 |
| 5,866,171 A | 2/1999 | Kata ............................ 425/46 |
| 5,876,527 A | 3/1999 | Tsuruta et al. .............. 152/541 |
| 5,925,713 A * | 7/1999 | Labauze ..................... 524/572 |
| 5,931,211 A | 8/1999 | Tamura .................... 152/209.5 |
| 5,971,046 A | 10/1999 | Koch et al. .............. 152/152.1 |
| 6,221,943 B1 | 4/2001 | Hergenrother et al. ...... 524/265 |
| 6,342,552 B1 | 1/2002 | Hergenrother et al. ...... 524/264 |
| 6,525,118 B2 | 2/2003 | Hergenrother et al. ...... 524/111 |
| 6,608,145 B1 | 8/2003 | Lin et al. ................. 525/332.6 |
| 6,667,362 B2 | 12/2003 | Robert et al. ............... 524/493 |

* cited by examiner

*Primary Examiner*—Robert D. Harlan
(74) *Attorney, Agent, or Firm*—Meredith Hooker; Arthur Reginelli

(57) ABSTRACT

A tire having a tread, where the tread includes a vulcanized rubber and silica that has been surface-modified with polymer chemically attached to the silica surface.

20 Claims, No Drawings

TIRE COMPOSITIONS COMPRISING SURFACE-MODIFIED SILICA

This application claims the benefit of U.S. Provisional Application Nos. 60/548,985, filed on Mar. 1, 2004, and 60/578,678 filed on Jun. 10, 2004.

FIELD OF THE INVENTION

This invention relates to vulcanizable rubber compositions that include surface-modified silica, which includes at least one polymer attached to a silica particle.

BACKGROUND OF THE INVENTION

In the art of making tires, it is desirable to employ rubber vulcanizates that demonstrate improved rolling resistance, wet skid resistance, and reduced hysteresis loss, at certain temperatures. Factors believed to affect these properties include the degree of filler networking (particle agglomeration), the degree of polymer-filler interaction, the cross-link density of the rubber, and polymer free-ends within the cross-linked rubber network.

Inorganic fillers, such as silica, impart improved wet traction and improved snow traction when used as filler within tire treads. Mixing silica into a tire stock, however, is difficult because silica particles agglomerate and therefore they are not easily dispersed. In response, processing and dispersing aids are used during compounding. Unfortunately, the use of these processing and dispersing aids may enhance the decrease in modulus at high temperatures. In addition, silica particles are less compatible than carbon black with rubber molecules.

Because precipitated silica has been increasingly used as reinforcing particulate filler in tires, there is a need to overcome the processing problems associated with silica fillers. Additionally, there is a need to increase polymer-filler interaction in silica-filled tires, thereby improving rolling resistance, abrasion, and wet skid resistance.

SUMMARY OF THE INVENTION

In general the present invention provides a method for providing a silica filled rubber composition, the method comprising providing a dehydroxylated silica particle, providing a living polymer, and mixing the silica with the living polymer to form a reaction product.

The present invention also includes a vulcanizable rubber composition comprising a rubbery elastomer, a surface-modified silica particle, where the surface-modified silica particle includes a polymer attached to a silica particle, where said attachment does not include a silica coupling agent residue, and a curing agent.

The present invention further provides a method for providing a silica filled rubber composition, the method comprising providing a surface-modified silica particle, where the surface-modified silica particle includes a polymer attached to a silica particle, where said attachment does not include a silica coupling agent residue, providing a rubber, and blending the surface-modified silica with the rubber to form a silica filled rubber composition.

DETAILED DESCRIPTION OF ILLUSTRATIVE EMBODIMENTS

Vulcanizable rubber compositions of this invention include a surface-modified silica filler. The vulcanizates of these rubber compositions are particularly useful for tire components.

The surface-modified silica filler includes a silica particle having at least one polymer chain attached thereto. In one or more embodiments, a plurality of polymers are attached to a silica particle.

The silica particle to which the polymer is attached includes conventional silica fillers. Useful silica (silicon dioxide) includes wet-process, hydrated silica produced by a chemical reaction in water, and precipitated as ultra-fine spherical particles. The surface area, as measured by the BET method, gives a measure of the reinforcing character of different silicas. Useful silicas include those having a surface area of about 32 to about 400 square meters per gram ($m^2/g$), in other embodiments about 100 to about 250 $m^2/g$, and in other embodiments about 150 to about 220 $m^2/g$. The pH of the silica filler may be from about 5.5 to about 7 and in other embodiments from about 5.5 to about 6.8. Commercially available silicas include Hi-Sil™ 215, Hi-Sil™ 233, Hi-Sil™ 255LD, and Hi-Sil™ 190 (PPG Industries; Pittsburgh, Pa.), ZeoSil™ 1165MP and 175GRPlus (Rhodia), Vulkasil™ S/kg (Bary AG), Ultrasil™ VN2, VN3 (Degussa), and HuberSil™ 8745 (Huber).

The polymer chains that are attached to the silica particle include rubbery polymers or oligomers. For purposes of this description, the term polymer will be used to refer to both high polymers (e.g., those having a molecular weight in excess of 50,000) as well as oligomers (e.g., those having a molecular weight from about 100 to about 50,000).

The rubbery polymers attached to the silica polymer include polymers of conjugated dienes or copolymers of conjugated dienes and vinyl aromatic monomers. Exemplary polymers include synthetic polyisoprene, polybutadiene, poly(isobutylene-co-isoprene), poly(styrene-co-butadiene), poly(styrene-co-isoprene), poly(isoprene-co-butadiene), and poly(styrene-co-butadiene-co-isoprene).

The rubbery polymers attached to the silica particles may be characterized by having a number average molecular weight of from about 1000 to about 300,000 g/mole, in other embodiments from about 5000 to about 200,000 g/mole, and in other embodiments from about 30,000 to about 100,000 g/mole.

The attachment between the silica particle and the polymer includes a chemical attachment. In other words, the attachment includes more than a simple physical force of attachment between the polymer and the particle. In certain embodiments, the attachment is covalent or ionic. In some embodiments, there is a direct attachment between the silica particle and the polymer; i.e., the bond is devoid of a coupling agent residue.

Several methods can be employed to chemically attach the polymer chain (or plurality thereof) to a silica particle. Exemplary methods by which the polymer can be attached to the silica particle include reaction of a silica particle with a living polymer and other grafting methods, including irradiation grafting, ionic grafting or free radical grafting. In one or more embodiments, the attachment is formed in the absence of a silica coupling agent. These grafting methods allow the polymer to react directly with the silica particle without the need for a sulfur-containing coupling agent. In one or more embodiments, the surface-modified silica contains less than about 0.1 weight percent sulfur, based upon the total weight of the surface-modified silica. In these or other embodiments, the surface-modified silica contains less than about 0.08 weight percent sulfur, in other embodiments less than about 0.05 weight percent sulfur, and in other embodiments less than about 0.03 weight percent sulfur, based upon the total weight of the surface-modified silica.

In one embodiment, the modified silica can be prepared by reacting the silica with a living polymer. This may be referred to as grafting.

In one or more embodiments, the silica filler is dehydroxylated. In certain embodiments, the silica is at least 50 percent dehydroxylated, in other embodiments at least 75 percent dehydroxylated, in other embodiments at least 90 percent dehydroxylated, and in other embodiments at least 95 percent dehydroxylated. This may be accomplished by heating under conditions sufficient to remove excess surface water and to dehydroxylate vicinal silanol groups at the silica surface. In one or more embodiments, the silica is heated for about one hour to about fifteen hours, although a longer heating time may be used, if desired. In one or more embodiments, heating the temperature may be above about 100° C. or higher, but below the melting temperature of the silica. In one or more embodiments, the silica is heated in a furnace or oven at temperatures of from about 450° C. to about 1600° C., and in other embodiments from about 500° C. to about 800° C. The level of dehydroxylation can be measured by thermogravimetric methods or similar methods.

Anionically-polymerized living polymers can be formed by reacting anionic initiators with certain unsaturated monomers to propagate a polymeric structure. Throughout formation and propagation of the polymer, the polymeric structure is anionic and "living." A living polymer, therefore, is a polymeric segment having a living or reactive end. For example, when a lithium (Li) containing initiator is employed to initiate the formation of a polymer, the reaction produces a reactive polymer having a Li atom at its living end. A new batch of monomer subsequently added to the reaction can add to the living ends of the existing chains and increase the degree of polymerization. When a functionalized initiator is employed, the reaction produces a reactive polymer having a Li atom at its living end and a functional group at its other end. For further information respecting anionic polymerizations, one can refer to George Odian, *Principles of Polymerization*, ch. 5 (3$^{rd}$ Ed. 1991), or Panek, 94 J. Am. Chem. Soc., 8768 (1972).

Monomers that can be employed in preparing an anionically-polymerized living polymer include any monomer capable of being polymerized according to anionic polymerization techniques. These monomers include those that lead to the formation of elastomeric homopolymers or copolymers. Suitable monomers include, without limitation, conjugated $C_4$-$C_{12}$ dienes, $C_8$-$C_{18}$ monovinyl aromatic monomers, and $C_6$-$C_{20}$ trienes. Examples of conjugated diene monomers include, without limitation, 1,3-butadiene, isoprene, 1,3-pentadiene, 2,3-dimethyl-1,3-butadiene, and 1,3-hexadiene. A non-limiting example of trienes includes myrcene. Aromatic vinyl monomers include, without limitation, styrene, ∀-methyl styrene, p-methylstyrene, and vinylnaphthalene. When preparing elastomeric copolymers, such as those containing conjugated diene monomers and aromatic vinyl monomers, the conjugated diene monomers and aromatic vinyl monomers may be used at a ratio of 95:5 to 50:50, and in other embodiments 95:5 to 65:35.

The amount of silica that is reacted with the living polymer may vary based upon many factors, including the type of polymer, molecular weight, number of live ends, type of initiator, surface area of the silica, particle size of the silica, and silica surface pretreatments. Nonetheless, in one embodiment, especially where an anionically polymerized diene polymer or copolymer having a molecular weight of from about 1000 to about 300,000 grams per mole polymer is reacted with dehydroxylated silica particles having a surface area of from about 32 to about 400 m$^2$/g, from about 1 to about 100, in other embodiments from about 5 to about 90, and in other embodiments from about 20 to about 50 parts by weight silica are reacted with 100 parts by weight polymer. Where excess silica is added as a reactant, the resulting modified silica filler will simply include unmodified silica within the guise of this description. On the other hand where excess polymer is employed as a reactant, the unreacted polymer may simply be removed via a suitable solvent.

The silica may be reacted with a living polymer by simply mixing the silica with the living polymer. Because it can often be difficult to maintain live-ends for long periods of time, one embodiment of this invention reacts the silica with the living polymer as part of the synthesis process for making the living polymer.

In one or more embodiments, when the silica and living polymer are reacted as part of the synthesis process for making the polymer, the silica can be added once a peak polymerization temperature is observed, which can be indicative of nearly complete monomer conversion. Because live ends may self terminate, the silica can be added within about 25 to about 35 minutes of the peak polymerization temperature in one or more embodiments.

After formation of the surface-modified silica, a processing aid and other optional additives such as antioxidant or oil can be added to the polymer cement. The surface-modified silica may be isolated from the solvent and may be rinsed with additional solvent to remove free polymer. The surface-modified silica can then be dried. Conventional procedures for desolventization and drying may be employed. In one embodiment, the modified silica may be isolated from the solvent by steam desolventization or hot water coagulation followed by filtration. Residual solvent may be removed by using conventional drying techniques such as oven drying or drum drying. Alternatively, the surface-modified silica may be directly drum dried.

Without wishing to be bound by any particular theory, is believed that the reaction between the silica and living polymer proceeds by the following reaction scheme:

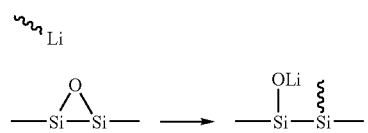

where

∼∼∼

Li is an anionically-polymerized living polymer and where Si (O) Si is the dehydroxylated silica particle surface, to produce a coated silica particle that be represented by the following diagram

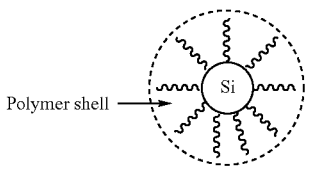

where

∿∿∿ is an anionically-polymerized polymer.

In other embodiments, polymer chains may be grafted to the surface of the silica particles via irradiation grafting, ionic grafting, or free radical grafting. For example, the polymer may be dissolved in a suitable solvent, mixed with silica particles, and the mixture irradiated with ultraviolet radiation. Alternately, the polymer may be dissolved in a suitable solvent and mixed with silica particles in the presence of a free radical generator, such as a peroxide. An example of an ionic grafting method includes dissolving a polymer in a suitable solvent and mixing the dissolved polymer with silica particles and an electrophilic compound. Suitable electrophilic compounds include aluminum chloride, boron trifluoride, and zinc chloride. Methods of grafting polymer chains to the surface of silica particles are described in more detail in U.S. Pat. No. 4,082,660, which is incorporated herein by reference. Ionic mechanisms by which various polymers are grafted onto a silica surface include propagation from a surface-initiating group, sometimes called graft polymerization. Examples of surface-initiating groups include (a) peroxyester groups, as described in N. Tsubokawa, H. Ishida, 24 J. Polym. 809 (1992); (b) azo groups, as described in N. Tsubokawa, A. Kogure, K. Maruyama, Y. Sone, M. Shimomura, 22 J. Polym. 827 (1990); (c) acylium perchlorate groups, as described in N. Tsubokawa, A. Kogure, 29 J. Polym. Sci., Part A 697 (1991); and (d) potassium carboxylate groups, described in N. Tsubokawa, A. Kogure, 25 J. Polym. 83 (1993), all of which are incorporated herein by reference.

The surface-modified silica of this invention is particularly useful in preparing tire components such as treads, subtreads, black sidewalls, body ply skins, bead filler, and the like. These tire components can be prepared by using the surface-modified silica as a filler. The surface modified silica can be used in lieu of or in addition to (i.e., as a partial replacement of) conventional silica. The surface-modified silica, or a combination of surface-modified silica and conventional silica, can be used in lieu of or in addition to other fillers including other inorganic fillers (e.g., aluminum hydroxide) or organic fillers such as carbon black.

In one embodiment, the surface-modified silica is employed in a tread formulation that includes from about 10 to about 100 parts by weight, in other embodiments from about 15 to about 90 parts by weight, and in other embodiments from about 20 to about 80 parts by weight silica per 100 parts by weight rubber phr. In these or other embodiments, at least about 20% by weight of the silica, in other embodiments at least about 50% by weight of the silica, and in other embodiments at least 70% by weight of the silica is the surface-modified silica of this invention, where the percent by weight refers to the weight of silica within the surface-modified silica composition (in other words, the weight percent referred to does not include the weight of polymer attached to the silica particle). The preparation of vulcanizable compositions and the construction and curing of the tire is not affected by the use of the surface-modified silica, although those skilled in the art will appreciate that the surface-modified silica includes a certain percentage of polymer (preferably rubbery polymer) and therefore adjustments to the amount of rubber employed (i.e., not attached to the silica particle per this invention) may be altered if desired.

The vulcanizable elastomer compositions include one or more rubbery polymers. Rubbery elastomers that may be used include natural and synthetic elastomers. Useful rubbery elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped.

The rubber compositions may include other fillers such as inorganic and organic fillers. The organic fillers include carbon black and starch. The inorganic fillers may include aluminum hydroxide, magnesium hydroxide, clays (hydrated aluminum silicates), and mixtures thereof, as well as additional silica that has not been modified according to the present invention. Reference to silica will refer to conventional silicas unless reference is made to the surface-modified silica, which is described herein.

Useful carbon black includes any commonly available carbon black including those having a surface area (EMSA) of at least 20 $m^2/g$, and in other embodiments at least 35 $m^2/g$ up to 200 $m^2/g$ or higher. Surface area values used in this application are those determined by ASTM test D-1765 by using the cetyltrimethyl-ammonium bromide (CTAB) technique.

If desired, carbon black and other fillers may be used in an amount from about 0.5 to about 70 parts by weight phr, in other embodiments from about 1 to about 50 parts by weight phr, and in other embodiments from about 2 to about 40 parts by weight phr.

A silica coupling agent may also be added. Suitable silica coupling agents include bifunctional silica coupling agents having a moiety (e.g., a silyl group) that will react or interact with the silica filler, and a moiety (e.g., a mercapto, amino, vinyl, epoxy or sulfur group) that will react or interact with the elastomer. Examples of silica coupling agents are bis(trialkoxysilylorgano) polysulfides, mercaptosilanes, and blocked mercaptosilanes.

Bis(trialkoxysilylorgano)polysulfides include bis(trialkoxysilylorgano) disulfides and bis(trialkoxysilylorgano) tetrasulfides. Mercaptosilane coupling agents include compounds represented by the formula

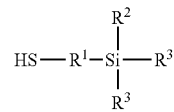

where $R^1$ is a divalent organic group, $R^2$ is a halogen atom or an alkoxy group, and each $R^3$ is independently a halogen, an alkoxy group, or a monovalent organic group. The divalent organic group is preferably an alkylene group containing from 1 to about 4 carbon atoms. The halogen is preferably chlorine, bromine, iodine, or fluorine, more preferably chlorine. The alkoxy group preferably has from 1 to 3 carbon atoms.

The monovalent organic groups are preferably hydrocarbyl groups such as, but not limited to alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to 30 carbon atoms. These hydrocarbyl groups may contain heteroatoms such as, but not limited to, nitrogen, oxygen, silicon, sulfur, and phosphorus atoms.

Examples of mercaptosilanes include 1-mercaptomethyltriethoxysilane, 2-mercaptoethyltriethoxysilane, 3-mercaptopropyltriethoxysilane, 3-mercaptopropylmethyldiethoxysilane, 2-mercaptoethyltriproxysilane, 18-mercaptooctadecyldiethoxychlorosilane, and mixtures thereof.

Blocked mercaptosilane coupling agents include sulfur-containing silanes where a sulfur atom is bonded to a silyl group, perhaps through a linking moiety, and the sulfur atom is also bonded to a blocking group. During processing, the blocking group is removed to form a mercaptosilane that is capable of acting as a coupling agent. An example of a simple blocked mercaptosilane can be represented by the formula

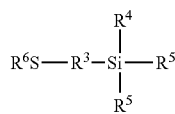

where $R^3$, $R^4$ and $R^5$ are as described above, and $R^6$ is a blocking group that will come off during processing leaving the S free to react with the polymer. Preferably, $R^6$ contains an unsaturated heteroatom or carbon chemically bound directly to S via a single bond, and is optionally substituted with one or more carboxylate ester or carboxylic acid functional groups. More preferably, $R^6$ is a carboxy group having from 1 to about 18 carbon atoms. Blocked mercaptosilanes are typically used in conjunction with a deblocking agent.

Silica coupling agents are further described in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 and 5,696,197, 6,608,145, 6,667,362, and 6,683,135, which are incorporated herein by reference.

If desired, the silica coupling agent may be added in an amount of from about 0.01 to about 25 weight percent, based upon the weight of the silica, in other embodiments from about 0.5 to about 15 weight percent, in other embodiments from about 1 to about 10 weight percent, based upon the weight of silica.

In one embodiment, practice of the invention advantageously allows for the amount of silica coupling agent to be reduced as compared to conventional methods. This advantage is believed to be due to the increased interaction of elastomer and the surface-modified silica.

In one or more embodiments, the amount of silica coupling agent is less than about 15 weight percent, in other embodiments less than about 10 weight percent, and in other embodiments less than about 7 weight percent. In other embodiments, less than about 5 weight percent silica coupling agent, in other embodiments less than about 2 weight percent silica coupling agent, and in other embodiments less than about 0.5 weight percent silica coupling agent, based upon the weight of the silica is employed. In one embodiment, the silica filled rubber composition is devoid of silica coupling agent.

Silica processing aids may be used to aid in, for example, dispersing and/or shielding the silica particles, preventing agglomeration, reducing viscosity, and increasing scorch time. Generally, silica processing aids do not substantially interact with the rubber molecules. Silica processing aids include monofunctional compounds that chemically react with surface silanol groups on the silica particles, but are not reactive with the elastomer. Silica processing aids also include shielding agents that physically shield the silanol groups, to prevent reagglomeration or flocculation of the silica particles.

Examples of suitable silica processing aids include glycols, alkyl alkoxysilanes, fatty acid esters of hydrogenated and non-hydrogenated $C_5$ and $C_6$ sugars, polyoxyethylene derivatives of the fatty acid esters, mineral fillers, and non-mineral fillers. Such silica dispersing agents can be used to replace all or part of the bifunctional silica coupling agents, while improving the processability of silica-filled rubber compounds by reducing the compound viscosity, increasing the scorch time, and reducing silica reagglomeration. Specific examples of glycols include diethylene glycol or polyethylene glycol.

Alkyl alkoxysilanes suitable for use as silica processing aids in the invention compounds have the formula

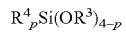

where each $R^3$ is independently as described above, each $R^4$ is independently a monovalent organic group, and p is an integer from 1 to 3, with the proviso that at least one $R^4$ is an alkyl group. Preferably, p is 1.

Examples of alkyl alkoxysilanes include octyl triethoxysilane, octyl trimethoxysilane, trimethyl ethoxysilane, cyclohexyl triethoxysilane, isobutyl triethoxysilane, ethyl trimethoxysilane, cyclohexyl tributoxysilane, dimethyl diethoxysilane, methyl triethoxysilane, propyl triethoxysilane, hexyl triethoxysilane, heptyl triethoxysilane, nonyl triethoxysilane, octadecyl triethoxysilane, methyloctyl diethoxysilane, dimethyl dimethoxysilane, methyl trimethoxysilane, propyl trimethoxysilane, hexyl trimethoxysilane, heptyl trimethoxysilane, nonyl trimethoxysilane, octadecyl trimethoxysilane, methyloctyl dimethoxysilane. Preferably, the alkyl alkoxysilane is a triethoxysilane. More preferably, the alkyl alkoxysilane is selected from at least one of n-octyl triethoxysilane, n-hexadecyl triethoxysilane, n-octadecyl triethoxysilane, and methyl n-octyl diethoxysilane.

The alkyl alkoxysilane can be present in the compound in an amount of about 0.1% to about 25% by weight, in other embodiments about 0.1% to about 15% by weight, based on the weight of silica.

Examples of fatty acid esters of hydrogenated and non-hydrogenated $C_5$ and $C_6$ sugars (e.g., sorbose, mannose, and arabinose) that are useful as silica processing aids include the sorbitan oleates, such as sorbitan monooleate, dioleate, trioleate and sesquioleate, as well as sorbitan esters of laurate, palmitate and stearate fatty acids. Fatty acid esters of hydrogenated and non-hydrogenated $C_5$ and $C_6$ sugars are commercially available from ICI Specialty Chemicals (Wilmington, Del.) under the trade name SPAN®. Representative products include SPAN® 60 (sorbitan stearate), SPAN® 80 (sorbitan oleate), and SPAN® 85 (sorbitan trioleate). Other commercially available fatty acid esters of sorbitan include the sorbitan monooleates known as Alkamul® SMO, Capmul® O, Glycomul® O, Arlacel® 80, Emsorb® 2500, and S-Maz® 80. When used with bis (trialkoxysilylorgano) polysulfide silica coupling agents, these fatty acid esters may be present in an amount of from about 0.1% to about 25% by weight based on the weight of the silica, in other embodiments from about 0.5% to about 20% by weight of silica, and in other embodiments from about 1% to about 15% by weight based on the weight of silica.

Examples of polyoxyethylene derivatives of fatty acid esters of hydrogenated and non-hydrogenated $C_5$ and $C_6$ sugars include polysorbates and polyoxyethylene sorbitan esters, which are analogous to the fatty acid esters of hydrogenated and non-hydrogenated sugars noted above except that ethylene oxide groups are placed on each of the hydroxyl groups. Commercially available polyoxyethylene derivatives of sorbitan include POE® (20) sorbitan monooleate, Polysorbate® 80, Tween® 80, Emsorb® 6900, Liposorb® O-20, and T-Maz® 80. The Tween® products are commercially available from ICI Specialty Chemicals. Generally, a useful amount of these optional silica dispersing aids is from about 0.1% to about 25% by weight based on the weight of the silica, in other embodiments from about 0.5% to about 20% by weight, and in other embodiments from about 1% to about 15% by weight based on the weight of the silica. In one embodiment, silica processing aids include n-octyltriethoxysilane.

Certain additional fillers can be utilized as processing aids, including mineral fillers, such as clay (hydrous aluminum silicate), talc (hydrous magnesium silicate), aluminum hydrate [$Al(OH)_3$] and mica, as well as non-mineral fillers such as urea and sodium sulfate. Preferred micas principally contain alumina and silica. When used, these fillers can be present in the amount of from about 0.5 to about 40 parts per phr, in other embodiments in an amount of about 1 to about 20 phr, and in other embodiments in an amount of about 1 to about 10 phr. These additional fillers can also be used as non-reinforcing fillers to support any of the silica dispersing aids and silica coupling agents described above. Silica processing aids are further described in U.S. Pat. Nos. 6,342,552, 6,525,118 and 6,608,145, which are incorporated herein by reference.

In one embodiment, practice of the invention advantageously allows for the amount of silica processing aid to be reduced as compared to conventional methods. This advantage is believed to be due to the increased interaction of elastomer and the surface-modified silica.

In one embodiment, the amount of silica processing aid is less than about 5 weight percent, in other embodiments less than about 1 weight percent, and in other embodiments less than about 0.5 weight percent, based upon the weight of the silica. In one embodiment, the silica filled rubber composition is devoid of silica processing aid.

A multitude of rubber curing agents may be employed, including sulfur or peroxide-based curing systems. Curing agents are described in 20 Kirk-Othmer, *Encyclopedia of Chemical Technology*, 365-468, ($3^{rd}$ Ed. 1982), particularly *Vulcanization Agents and Auxiliary Materials*, 390-402, and A. Y. Coran, *Vulcanization in Encyclopedia of Polymer Science and Engineering*, ($2^{nd}$ Ed. 1989), which are incorporated herein by reference. Vulcanizing agents may be used alone or in combination.

The vulcanization accelerators are not particularly limited. Examples include thiazol vulcanization accelerators, such as 2-mercaptobenzothiazol, dibenzothiazyl disulfide, N-cyclohexyl-2-benzothiazyl-sulfenamide (CBS), N-tert-butyl-2-benzothiazyl sulfenamide (TBBS), and guanidine vulcanization accelerators, such as 1,3-diphenylguanidine. If used, the amount of accelerator can be from about 0.1 to about 5 phr, and in other embodiments from about 0.2 to about 3 phr.

Other ingredients that may be employed include oils, waxes, scorch inhibiting agents, zinc oxide, tackifying resins, reinforcing resins, activators, retarders, plasticizers, pigments, antioxidants, anti-ozonants, fatty acids such as stearic acid, peptizers, and one or more additional rubbers. Typical rubber formulations for use in tire components, especially tire treads, include from about 0 to about 75, and in other embodiments from about 5 to about 50 parts by weight, oil per 100 parts by weight rubber. Rubber compounding techniques and the additives employed therein are generally known as disclosed in the in Stephens, *The Compounding and Vulcanization of Rubber*, in *Rubber Technology* ($2^{nd}$ Ed. 1973).

The vulcanizable rubber composition of the present invention can be prepared by conventional methods. The mixing conditions and procedures applicable to silica-filled tire formulations are well known, as described in U.S. Pat. Nos. 5,227,425, 5,719,207, 5,717,022, as well as European Patent No. 890,606, all of which are incorporated herein by reference.

In one or more embodiments, the vulcanizable rubber composition is prepared by forming an initial composition that includes the elastomer, surface-modified silica, and optionally other ingredients. To prevent premature vulcanization (also known as scorch), this initial composition may exclude vulcanizing agents. Once the initial composition is processed, the vulcanizing agents may be introduced and blended into the initial composition to form a final mix. Additional ingredients, such as accelerators, may be added to the final mix during this stage. The final mix can be prepared at low temperatures that do not initiate the vulcanization process. Optionally, additional mixing stages, sometimes called remills, can be employed between the initial mix stage and the final mix stage.

When describing the temperatures during mixing, two types of temperatures may be referred to. One type, the mixer temperature, refers to the stabilized temperature of the mixing equipment prior to addition of the ingredients. The second type refers to the surface temperature of the composition. Unless specifically referred to as the mixer temperature, any reference to temperature in this specification should be understood to mean the surface temperature of the composition.

For the first mixing step, the initial mixer temperature is preferably from about 25° C. to about 125° C., and more preferably from about 70 to about 120° C. The mixing conditions are preferably controlled to maintain the surface temperature of the composition within the range of about 25° C. to about 195° C., more preferably about 100 to about 185° C., and even more preferably about 135° C. to about 165° C. during mixing. These mixing conditions are maintained for the amount of time necessary to achieve good dispersion of the filler within the rubber. One of ordinary skill in the art will appreciate that the necessary amount of time will vary depending upon such factors as mixer size, sheer, temperature, and the like.

The order of addition of the ingredients is not critical. In one embodiment, the elastomer is added first, and then all of the other ingredients are added at once. In another embodiment, the silica filler is added in increments. If desired, the temperature of the composition can be decreased before each incremental addition, then brought back to the preferred mixing temperatures set forth above.

After the initial composition ingredients are mixed, the initial composition is cooled to a surface temperature below the intended temperature for the next mixing step. For example, when a remill step is performed and the desired surface temperature of the remill composition during the second mixing step is about 150° C., the initial composition is cooled to a surface temperature of below about 150° C. This may be accomplished by discharging the initial composition, cooling, and re-charging the same mixer apparatus or transferring the composition to another mixer. If the same mixing apparatus is to be used for the next mixing step, the initial composition may be cooled within the mixer.

The initial composition may be further mixed in a second mixing step, or remill, during which additional ingredients may optionally be added, including silica coupling agents, silica processing aids, and additional filler. This resulting mixture may be referred to as a remill composition.

During the second mixing step, the mixing conditions can be controlled to achieve a surface temperature of the composition within the range of about 70° C. to about 175° C., in other embodiments about 135° C. to about 165° C., and in other embodiments about 140° C. to about 160° C. These mixing conditions are maintained for the amount of time necessary to reduce the viscosity and improve the dispersion of the filler within the rubber. One of ordinary skill in the art will appreciate that the necessary amount of time will vary depending upon such factors as mixer size, sheer, temperature, and the like.

In the final mixing step, the initial or remill composition can be combined with ingredients including a cure agent at a temperature below the vulcanization temperature. Optionally, accelerators and other ingredients may be added during this mixing step. The mixing conditions may be controlled to achieve a surface temperature of the composition within the range of about 40° C. to about 120° C., in other embodiments about 60° C. to about 110° C., and in other embodiments about 75° C. to about 100. These conditions can be maintained for the amount of time necessary to achieve good mixing.

The vulcanizable rubber composition of the present invention is particularly useful in preparing tire components such as treads, subtreads, black sidewalls, body ply skins, bead filler, and the like. These compositions can be processed into tire components according to ordinary tire manufacturing techniques including standard rubber shaping, molding and curing techniques. Pneumatic tires can be made as discussed in U.S. Pat. Nos. 5,866,171, 5,876,527, 5,931, 211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

Example 1

The silica filler employed in these examples was HiSil® 190G, available from PPG Industries. The silica was heated in a furnace at about 500° C. for about 15 hours. The heat-treated silica was cooled and stored in a dessicator. Just prior to use, the silica was transferred into dried bottles under inert atmosphere and the bottles were sealed.

Example 2

To a 18.9 L reactor equipped with turbine agitator blades was added 3.2 kilograms (kg) hexane, 11.8 kg (23 wt. %) 1,3-butadiene in hexane, and 3 cubic centimeters (cc) modifier, and the batch temperature was controlled at about 85° C. To the reactor was charged 0.1265 kg (3 wt. %) butyllithium in hexane. Approximately 5 minutes after a peak temperature was reached, the batch was cooled to 32° C.

Example 3

Approximately 350 grams (g) of live polybutadiene cement (18% by weight polybutadiene) was transferred to the sealed bottles containing 20 g heat-treated silica. After the bottles were shaken for about 30 minutes, approximately 1.5 g of butylated hydroxytoluene (BHT) was injected into the bottle. The polybutadiene-coated (PB-coated) silica was allowed to settle, the hexane solution (containing free polybutadiene polymer) was removed, and the silica was twice rinsed with additional BHT and hexane. After rinsing, the silica was dried in a vacuum oven at about 50° C. for about 10 hours.

The ratio of the weight of silica to the weight of grafted polymer was determined gravimetrically. More specifically, a clean crucible was heated in a furnace at 550° C. for 3 hours, to remove water and organic impurities. The crucible was cooled in a dessicator, then filled with an initial amount of coated silica. The filled crucible was placed into a furnace at 550° C. for 3 hours, to remove all of the polymer coating. The crucible was again cooled in a dessicator, then weighed to determine the final amount of silica. The weight of grafted polybutadiene was determined from the difference between the initial amount of coated silica and the final amount of silica. The ratio of silica (Si) to polybutadiene (PB) was then determined from the final weight of silica and the weight of the grafted PB. The ratio of Si to PB in the present example was 4:1. The number average molecular weight of the PB, as measured by gel permeation chromatography, was 55,900.

Examples 4-8

The PB-coated silica of Example 3 was employed in carbon black/silica tire formulations. The formulations are presented in Table I. More specifically, the rubber of Example 3 was incorporated in the formulation of Example 6. Untreated silica was incorporated into the formulations of Control Examples 4 and 5. Untreated silica and polybutadiene were incorporated into the formulations of Examples 7 and 8.

TABLE I

| | Example No. (weight parts) | | | | |
|---|---|---|---|---|---|
| | 4 | 5 | 6 | 7 | 8 |
| SBR* | 86.3 | 86.3 | 86.3 | 86.3 | 86.3 |
| Natural Rubber | 25 | 25 | 25 | 25 | 25 |
| Carbon Black | 35 | 35 | 35 | 35 | 35 |
| Untreated Silica | 35 | 35 | 0 | 35 | 35 |
| PB-coated Silica | 0 | 0 | 42 | 0 | 0 |
| Polybutadiene | 0 | 0 | 0 | 7.0 | 11.9 |
| Wax | 1 | 1 | 1 | 1 | 1 |
| Antioxidant | 1.0 | 1.0 | 1.0 | 1.0 | 1.0 |
| Zinc Oxide | 2.5 | 2.5 | 2.5 | 2.5 | 2.5 |
| Stearic Acid | 1.5 | 1.5 | 1.5 | 1.5 | 1.5 |
| Coupling Agent | 3.5 | 3.5 | 3.5 | 3.5 | 3.5 |
| Aromatic Oil | 21.9 | 21.9 | 21.9 | 21.9 | 21.9 |
| Total | 212.6 | 212.6 | 219.6 | 219.6 | 224.5 |
| Remill | 212.6 | 212.6 | 219.6 | 219.6 | 224.5 |
| Final Formulation | | | | | |
| Initial | 212.6 | 212.6 | 219.6 | 219.6 | 224.5 |
| Sulfur | 2.3 | 2.3 | 2.3 | 2.3 | 2.3 |
| Accelerators | 2.0 | 2.0 | 2.0 | 2.0 | 2.0 |
| Total | 216.8 | 216.8 | 223.8 | 223.8 | 228.7 |

*Bound styrene = 35 wt. %; vinyl = 18 wt. %; oil = 13 wt. %; Tg = −44° C.

Each carbon black/silica rubber compound was prepared in three stages named Initial, Remill and Final. In the initial stage, SBR and natural rubber were mixed with carbon black, silica, an antioxidant, stearic acid, a coupling agent and aromatic oil in a 300 g Banbury mixer operating at 60 RPM and 99° C. The initial compositions were mixed for 4 minutes. At the end of the mixing the surface temperature of the composition was approximately 170° C. The sample was cooled to less than about 80° C. and transferred to a remill mixer.

In the remill stage, the initial composition was mixed at about 60 RPM. The starting temperature of the mixer was about 80° C. The remill material was removed from the mixer after about 2 minutes, when the surface temperature of the remill composition was between 135 and 150° C.

The finals were mixed by adding the remills, zinc oxide and the curative 15 materials to the mixer simultaneously. The initial mixer temperature was 62° C. and it was operating at 60 RPM. The final material was removed from the mixer after 1 minute when the surface temperature of the material was about 93° C.

Test specimens of each rubber formulation were prepared by cutting out the required mass from an uncured sheet (about 2.5 mm to 3.81 mm thick), and cured within closed cavity molds under pressure for 15 minutes at 171° C. The test specimens were then subjected to various physical tests, and the results of these tests are reported in Table II. Dynamic properties were determined by using a Rheometrics Dynamic Analyzer (RDA). Strain sweep experiments were conducted at a frequency of 10 Hertz (Hz) and temperatures of 0 and 65° C., with strain sweeping from 0% to 10%.

The Zwick Rebound Test is a dynamic test that measures rebound resilience. Rebound resilience is typically defined as the ratio of mechanical energies before and after impact. Samples were tested according to ASTM D1054-91(2000). Sample specimens were milled and cured according to ASTM D1054, using the mold specified. The cured sample was coated with talc and conditioned in an oven for about one hour at the recommended temperature. The conditioned sample was placed into a Zwick type rebound tester, a pendulum was swung against the sample, and the angle at which the pendulum bounced back was measured. Percent rebound is calculated according to the equation specified in ASTM D1054.

TABLE II

| | Example No. | | | | |
|---|---|---|---|---|---|
| | 4 | 5 | 6 | 7 | 8 |
| $ML_{1+4}$@100° C. | 81.1 | 85.4 | 71.3 | 74.0 | 66.0 |
| G' (0° C.) (5% strain, 10 Hz) (Mpa) | 5.21 | 5.14 | 4.13 | 4.47 | 4.51 |
| G" (0° C.) (5% strain, 10 Hz) (Mpa) | 1.92 | 1.90 | 1.36 | 1.54 | 1.56 |
| tan δ (0° C.) (5% strain, 10 Hz) (Mpa) | 0.368 | 0.370 | 0.331 | 0.345 | 0.345 |
| G' (65° C.) (5% strain, 10 Hz) (Mpa) | 2.69 | 2.64 | 2.22 | 2.44 | 2.46 |
| G" (65° C.) (5% strain, 10 Hz) (Mpa) | 0.37 | 0.34 | 0.27 | 0.31 | 0.34 |
| )G' (65° C.) (MPa)** | 1.697 | 1.271 | 0.848 | 1.137 | 1.252 |
| tan δ (65° C.) (5% strain, 10 Hz) | 0.139 | 0.128 | 0.122 | 0.126 | 0.139 |
| Zwick Rebound (ambient) | 39.5 | 40.0 | 45.3 | 42.1 | 43.8 |
| Zwick Rebound (150° C.) | 59.7 | 59.9 | 64.1 | 60.2 | 59.6 |

**)G' = G' (@0.25% E) − G' (@14.5% E)

The compound Mooney for Example 6 is lower than for Examples 4 and 5, indicating better processing for rubber compounded with surface-modified silica. While the tan δ values are comparable at 0° C. and at 65° C., the ΔG' at 65° C. is lower for Example 6. Lower ΔG' values can indicate lower Payne effect filler-filler interaction. The higher Zwick rebound resilience of Example 6 indicates lower hysteresis loss.

Example 9

PB-coated silica was prepared as in Example 3, except that the ratio of Si to PB was 2:1, and the number average molecular weight of the PB was 49,200.

Examples 10-13

The PB-coated silica of Example 9 was employed in the carbon black/silica tire formulation of Example 10. Untreated silica and polybutadiene were incorporated into the formulations of Examples 11-13. The formulations of Examples 10-13 are presented in Table III.

TABLE III

| | Example No. (weight parts) | | | |
|---|---|---|---|---|
| | 10 | 11 | 12 | 13 |
| SBR* | 86.3 | 86.3 | 86.3 | 86.3 |
| Natural Rubber | 7.4 | 7.4 | 7.4 | 7.4 |
| Carbon Black | 35 | 35 | 35 | 35 |
| Untreated Silica | 0 | 35 | 35 | 35 |
| PB-coated Silica | 52.6 | 0 | 0 | 0 |
| Polybutadiene | 0 | 17.6 | 17.6 | 17.6 |
| Wax | 1 | 1 | 1 | 1 |
| Antioxidant | 1.0 | 1.0 | 1.0 | 1.0 |
| Stearic Acid | 1.5 | 1.5 | 1.5 | 1.5 |

TABLE III-continued

| | Example No. (weight parts) | | | |
|---|---|---|---|---|
| | 10 | 11 | 12 | 13 |
| Coupling Agent | 0 | 3.5 | 2.5 | 0 |
| Aromatic Oil | 21.9 | 21.9 | 21.9 | 21.9 |
| Total | 206.7 | 210.2 | 209.2 | 206.7 |
| Remill | 206.7 | 210.2 | 209.2 | 206.7 |
| Final Formulation | | | | |
| Initial | 206.7 | 210.2 | 209.2 | 206.7 |
| Zinc Oxide | 2.5 | 2.5 | 2.5 | 2.5 |
| Sulfur | 2.3 | 2.3 | 2.3 | 2.3 |
| Accelerators | 2.0 | 2.0 | 2.0 | 2.0 |
| Total | 213.5 | 217.0 | 216.0 | 213.5 |

Samples were prepared and tested as described above for Examples 4-8. Results are summarized in Table IV.

TABLE IV

| | Example No. | | | |
|---|---|---|---|---|
| | 10 | 11 | 12 | 13 |
| $ML_{1+4}$@100° C. | 101.5 | 76.6 | 84.3 | 116.1 |
| G' (0° C.) (5% strain, 10 Hz) (Mpa) | 5.53 | 5.59 | 6.09 | 7.83 |
| G" (0° C.) (5% strain, 10 Hz) (Mpa) | 2.02 | 2.24 | 2.44 | 2.88 |
| tan δ (0° C.) (5% strain, 10 Hz) (Mpa) | 0.366 | 0.400 | 0.400 | 0.367 |
| G' (65° C.) (5% strain, 10 Hz) (Mpa) | 2.83 | 2.65 | 2.93 | 3.56 |
| G" (65° C.) (5% strain, 10 Hz) (Mpa) | 0.46 | 0.44 | 0.53 | 0.78 |
| )G' (65° C.) (MPa)** | 2.063 | 2.070 | 2.649 | 4.313 |
| tan δ (65° C.) (5% strain, 10 Hz) | 0.162 | 0.165 | 0.179 | 0.219 |
| Zwick Rebound (ambient) | 38.7 | 36.7 | 35.9 | 33.1 |
| Zwick Rebound (150° C.) | 56.1 | 55.2 | 52.2 | 47.5 |

**)G' = G' (@0.25% E) – G' (@14.5% E)

Various modifications and alterations that do not depart from the scope and spirit of this invention will become apparent to those skilled in the art. This invention is not to be duly limited to the illustrative embodiments set forth herein.

What is claimed is:

1. A method for providing a silica-filled rubber composition, the method comprising:
   providing a dehydroxylated silica particle;
   providing a living polymer, where the polymer includes an elastomer; and
   mixing the silica with the living polymer to form a reaction product.

2. The method of claim 1, where said step of providing dehydroxylated silica includes providing a heat-treated silica particle.

3. The method of claim 1, where said step of providing a living polymer includes reacting monomer with an anionic polymerization initiator, where said monomer includes conjugated dienes.

4. The method of claim 3, where the monomer includes 1,3-butadiene and optionally styrene.

5. The method of claim 1, where said step of mixing includes mixing a silica particle with the living polymer within an organic solvent.

6. The method of claim 5, further comprising the step of recovering the reaction product.

7. The method of claim 6, further comprising the step of blending the reaction product with ingredients including an elastomer and a curing agent to form a vulcanizable composition of matter.

8. The method of claim 7, where the vulcanizable composition of matter comprises less than about 15 weight percent silica coupling agent based upon the weight of silica particles.

9. The method of claim 7, where said step of blending includes:
   mixing, at a mixer temperature of at least 25° C., ingredients including the elastomer, the reaction product having anionically polymerized polymer chains grafted to the silica particles, and optionally coupling agents, processing aids, zinc oxide, oil, and filler, to form an initial composition;
   allowing the initial composition to cool to a surface temperature of less than about 175° C.;
   mixing the initial composition, at a surface temperature of from about 70° C. to about 175° C., optionally with ingredients including silica coupling agents, silica processing aids and additional filler, to form a remill composition; and
   mixing the remill composition, at a surface temperature lower than a vulcanization temperature, with ingredients including a cure agent, to form a vulcanizable elastomer composition.

10. The method of claim 7, further comprising the step of forming the vulcanizable composition of matter into a tire component.

11. The method of claim 10, where the tire component is a green tread, and the method further comprises the step of curing the green tread to form a tire tread.

12. A method for providing a silica-filled rubber composition, the method comprising:
   providing a surface-modified silica particle, where the surface-modified silica particle includes a polymer attached to a silica particle, where said attachment does not include a silica coupling agent residue;
   providing a rubbery elastomer; and
   blending the surface-modified silica with the rubbery elastomer to form a silica filled rubber composition.

13. The method of claim 1, where the reaction product is devoid of a coupling agent residue.

14. The method of claim 1, where the silica particle is dehydroxylated by heating the particle to remove excess surface water and to dehydroxylate vicinal silanol groups at the surface of the silica particle.

15. The method of claim 12, where the surface-modified silica particle has a sulfur content of less than about 0.1 weight percent.

16. The method of claim 12, where the polymer has a number average molecular weight of from about 1,000 to about 300,000.

17. The method of claim 12, where the step of providing a surface-modified silica particle includes grafting one or more polymer chains to the surface of the silica particle.

18. The method of claim 17, where the step of grafting includes dissolving a polymer in a solvent, combining the dissolved polymer with silica particles to form a mixture, and irradiating the mixture with ultraviolet radiation.

19. The method of claim 17, where the step of grafting includes dissolving a polymer in a solvent, and combining the dissolved polymer with silica particles and a free radical generator.

20. The method of claim 17, where the step of grafting includes dissolving a polymer in a solvent, and combining the dissolved polymer with silica particles and an electrophilic compound.

* * * * *